United States Patent [19]

Quadbeck-Seeger et al.

[11] 4,002,664
[45] Jan. 11, 1977

[54] MANUFACTURE OF DIMETHYLAMINOBENZENECARBOXYLIC ACID ESTERS

[75] Inventors: Hans-Juergen Quadbeck-Seeger; Helmut Hoch, both of Ludwigshafen, Germany

[73] Assignee: BASF Aktiengesellschaft, Ludwigshafen (Rhine), Germany

[22] Filed: June 5, 1974

[21] Appl. No.: 476,394

[30] Foreign Application Priority Data

June 9, 1973  Germany .......................... 2329553
Feb. 15, 1974  Germany .......................... 2407160

[52] U.S. Cl. .......................................... 260/471 R
[51] Int. Cl.² ........................................ C07C 99/00
[58] Field of Search ........... 260/471 R, 583 M, 580

[56] References Cited

OTHER PUBLICATIONS

Pearson, D. E. et al., Journal American Chemical Society, vol. 73 (1951), p. 864 relied on.
Campbell et al., Australia Journal of Chemistry, vol. 23 (1970) pp. 203 and 204.

*Primary Examiner*—Richard L. Raymond
*Attorney, Agent, or Firm*—Johnston, Keil, Thompson & Shurtleff

[57] ABSTRACT

Dimethylaminobenzenecarboxylic acid esters are produced by reaction of nitrobenzenecarboxylic acid esters with formaldehyde and hydrogen under pressure in the presence of a hydrogenation catalyst containing metals of atomic numbers 24 to 29 and of a weak acid, at temperatures from 35° to 150° C. The products are starting materials for the synthesis of dyes, especially of crystal violets, and of reactive dyes and pesticides.

14 Claims, No Drawings

MANUFACTURE OF DIMETHYLAMINOBENZENECARBOXYLIC ACID ESTERS

The invention relates to a process for the manufacture of dimethylaminobenzenecarboxylic acid esters by reaction of nitrobenzenecarboxylic acid esters with formaldehyde and hydrogen under pressure in the presence of a hydrogenation catalyst containing metals of atomic number 24 to 29 and of a weak acid, at a temperature from 35° to 150° C.

Aust. J. Chem., volume 23 (1970), page 204, together with J. Amer. Chem. Soc., volume 73 (1951), page 864, discloses that m-dimethylaminobenzoic acid methyl ester is produced by reductive methylation of m-nitrobenzoic acid methyl ester with hydrogen and formaldehyde in ethyl alcohol in the presence of hydrochloric acid and a pre-reduced Adams catalyst at 5° C under a pressure of 45 lbs. The article in the American journal points out that the reductive methylation is rarely used for the manufacture of tertiary aromatic amines, since the starting materials can easily condense, and it solely recommends the abovementioned method. The Australian journal does not state the yields of ester manufactured by this method. If the process is carried out industrially, the yield of end product is poor. Since the end use of 3-dimethylaminobenzoic acid methyl ester and of 3-dimethylaminobenzoic acid requires that these compounds should be of high purity, the isolation of the end product is costly and hence the process is economically unsatisfactory.

German Patent No. 716,668 teaches that special conditions must also be observed in the reductive methylation of aminobenzoic acid derivatives. Though secondary amines can be obtained with other catalysts, for example nickel or kieselguhr, using additional catalysts such as piperidine, and thus, for example, isobutylaminobenzoic acid ethyl ester can be obtained from p-aminobenzoic acid ethyl ester with isobutyraldehyde, platinum catalysts in the presence of hydrochloric acid at 20° C and under 3.5 stmospheres gauge pressure are used for the manufacture of tertiary amines, for example of p-N-dimethylaminobenzamide or of N-dimethylaminobenzoic acid ethyl ester, from the corresponding primary amines by reductive methylation, as is shown in Examples 12 to 15. The yields of end product are not quoted.

Palladium on active charcoal, in the presence of acetic acid or in ethanolic solution, with or without sodium acetate, has also been described as a catalyst for the reductive methylation of nitrobenzoic acids at room temperature and atmospheric pressure (J. Chem. Soc., 1950, pages 1,342 et seq.). Freifelder, Practical Catalytic Hydrogenation (Wiley, N.Y., 1971), pages 346 et seq shows that specific catalysts and reaction conditions must be selected in accordance with the starting material and with the substituents. For the reductive methylation of 4-aminobenzoic acid, in particular, platinum oxide is recommended as the catalyst; it is shown that the dimethylamino compound can be produced in substantial yield only if hydrochloric acid is present (page 376).

All these processes are unsatisfactory, particularly in industrial operation, from the point of view of simple and economical operation, yield and space-time yield of end product and the economics of the catalyst. The use of hydrochloric acid entails corrosion problems. In some cases, long reaction times are necessary in order to obtain substantial yields of end product.

It is an object of this invention to provide simpler and more economical process for the manufacture of dimethylaminobenzenecarboxylic acid esters which gives improved yield, purity and spacetime yield.

We have found that dimethylaminobenzenecarboxylic acid esters are obtained in an advantageous manner by reaction of nitrobenzenecarboxylic acid esters with formaldehyde and hydrogen in the presence of hydrogenation catalysts by a method wherein the reaction is carried out in the presence of a hydrogenation catalyst which contains one or more metals of atomic numbers from 24 to 29, and of weak organic acids, at temperatures from 35° to 150° C and a pressure of at least 40 atmospheres.

When 3-nitrobenzoic acid methyl ester is used, the reaction can be represented by the following equation:

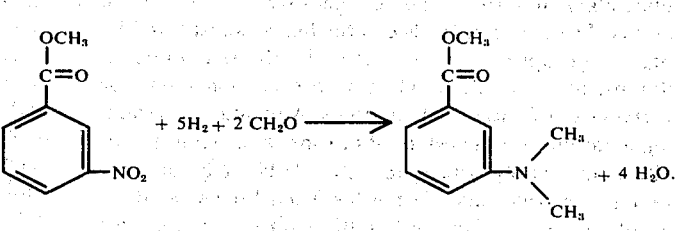

When 4-nitrophthalic acid dimethyl ester is used, the reaction can be represented by the following equation:

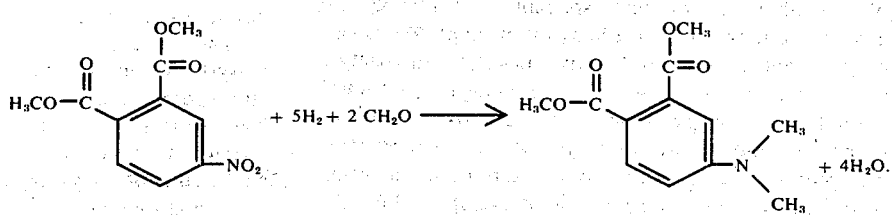

Compared to the conventional processes, the process according to the invention gives dimethylaminobenzenecarboxylic acid esters more simply and more economically, and in better yield, purity and space-time yield. The process does not require costly catalysts and can in particular also be used industrially. It avoids corrosion problems. All these advantageous results are surprising in the light of the art.

The starting materials used are the esters of nitrobenzene monocarboxylic and polycarboxylic acids and preferably the esters of nitrobenzenecarboxylic acids with aromatic, cycloaliphatic, araliphatic and, preferably, aliphatic alcohols, advantageously the esters of 4-nitrobenzoic acid, and preferably of 3-nitrobenzoic acid, with aromatic, cycloaliphatic, araliphatic and, preferably, aliphatic alcohols. Preferred starting materials are those of the formula

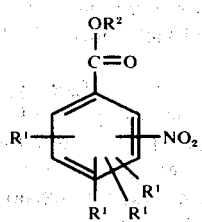

and accordingly, preferred end products are those of the formula

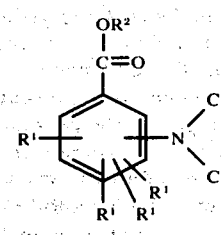

wherein the individual $R^1$ are identical or different and each is hydrogen or —$COOR^2$ and the individual $R^2$ are identical or different and each is phenyl, aralkyl of 7 to 12 carbon atoms, cyclohexyl, cyclopentyl or, in particular, alkyl of 1 to 10, advantageously 1 to 4, carbon atoms. The above radicals can further be substituted by organic groups which are inert under the reaction conditions, for example alkyl of 1 to 4 carbon atoms or carbalkoxy of 2 to 4 carbon atoms. Advantageous starting materials are the esters of nitrobenzoic acids and of nitrobenzenepolycarboxylic acids, especially of benzenedicarboxylic acids or benzenetricarboxylic acids in which the nitro group is not in the o-position to an ester group. Examples of starting materials which can be used as the phenyl, benzyl, cyclohexyl, cyclopentyl, tert.-butyl, methyl, ethyl, propyl, isopropyl, p-ethylphenyl, p-carbomethoxyphenyl, isobutyl and n-butyl esters of 2-nitrobenzoic acid and especially of 3-nitrobenzoic acid, the phenyl, benzyl, phenylethyl, naphthyl, cyclobutyl, n-decyl, sec.-butyl, amyl, hexyl, 2-ethyl-hexyl, octyl, isoamyl, cyclohexyl, cyclopentyl, tert.-butyl, methyl, ethyl, propyl, isopropyl, p-ethylphenyl, p-carbomethoxyphenyl, isobutyl and n-butyl esters of 3-nitrophthalic acid, esters of corresponding alcohols with 2-nitro-isophthalic acid, 4-nitro-isophthalic acid, 2-nitro-terephthalic acid, 4-nitrobenzene-1,2,3-tricarboxylic acid, 3-nitrobenzene-1,2,4-tricarboxylic acid, 2-nitrobenzene-1,3,5-tricarboxylic acid, 2-nitrobenzene-1,3,4,5-tetracarboxylic acid, 3-nitrobenzene-1,2,4,5-tetracarboxylic acid, 5-nitrobenzene-1,2,3,4-tetracarboxylic acid, and nitrobenzenepentacarboxylic acid, and preferably the esters of corresponding alcohols of 5-nitro-isophthalic acid, of 4-nitro-phthalic acid and 5-nitrobenzene-1,2,3-tricarboxylic acid.

The formaldehyde can be used as gas, as a solution in alcohol, for example in ethanol, or, preferably, as an aqueous solution, suitable of 30 to 40 percent strength by weight. The starting material can be reacted with formaldehyde in the stoichiometric amount or in excess, preferably in a ratio from 2 to 8, and especially from 2 to 3 moles of formaldehyde per mole of starting material.

The reaction is carried out at temperatures from 35° to 150° C, preferably from 45° to 95° C and especially from 45° to 70° C, and at pressures of at least 40, preferably from 50 to 250, advantageously from 70 to 150, and especially from 70 to 110, atmospheres, continuously or batchwise. Preferably, organic solvents which are inert under the reaction conditions are used, for example alkanols, especially alkanols of 1 to 4 carbon atoms, such as methanol, ethanol and isopropyl alcohol, glycols, for example methyl ethylene glycol, or appropriate mixtures, advantageously in amounts from 200 to 1,000% by weight, especially from 200 to 400% by weight, based on the starting ester.

The reaction is carried out in the presence of weak organic acids, in general of dissociation constant at least $1.5 \times 10^{-4}$, preferably from $1.5 \times 10^{-4}$ to $1 \times 10^{-6}$, and especially from $1.5 \times 10^{-4}$ to $1 \times 10^{-5}$. Preferred acids are aliphatic carboxylic acids of 3 to 10 carbon atoms, preferably alkanecarboxylic acids or alkenecarboxylic acids, advantageously monocarboxylic acids or dicarboxylic acids, which are optionally substituted by hydroxyl groups or nitrile groups, such as propionic acid, butyric acid, acrylic acid, maleic acid, crotonic acid, isocrotonic acid, vinylacetate acid, succinic acid, isobutyric acid, angelic acid, tiglic acid, lavulinic acid, glutaric acid, valeric acid, isovaleric acid, trimethylacetic acid, adipic acid, caproic acid, diethylacetic acid, enanthic acid and pelargonic acid. However, formic acid, acetic acid, lactic acid, cycloaliphatic carboxylic acids such as cyclopropanecarboxylic acid, cyclobutanecarboxylic acid and cyclohexanecarboxylic acid, uric acid, heterocyclic carboxylic acids such as furane-2-carboxylic acid, aromatic carboxylic acids such as benzoic acid, m-hydroxybenzoic acid, terephthalic acid, phenylacetic acid, p-toluic acid, p-methoxybenzoic acid, cinnamic acid and palmitic acid, and cholic acid, can also be used. The use of alkanecarboxylic acid of 3 to 8 carbon atoms, especially propionic acid, is particularly advantageous. In general, amounts of 0.1 to 0.5, preferably of 0.1 to 0.3, mole of acid per mole of starting ester are suitable.

The hydrogenation catalyst is, in general cobalt, copper, manganese and/or nickel catalysts, for example suitable sintered catalysts. The metals can also be present in the catalyst in the form of their oxides and/or mixed with phosphoric acid. Advantageous catalysts of the type mentioned contain from 3 to 30% by weight of copper and/or cobalt, from 0.5 to 10% by weight of manganese and from 10 to 80% by weight of nickel. From 0.1 to 5% by weight of phosphoric acid, based on the amount of metal, may be used additionally.

The hydrogenation catalyst is, as a rule, used in the reaction in amounts from 0.5 to 50, and preferably from 2 to 30% by weight, and in the case of Raney nickel preferably from 2 to 5% by weight, based on starting ester. It can be used mixed with a support which is suitable for the reaction, for example silicon dioxide, the amount of catalyst being, as a rule, from 10 to 40% by weight of the mixture of catalyst and support. The following are examples of suitable catalyst mixtures:

a. 70.5% of Ni, 19.7% of Co, 5.4% of Mn and 4.2% of phosphoric acid.
b. 15% of Ni, 6.1% of Cu, 1.5% of Mn and 0.9% of phosphoric acid on $SiO_2$.
c. 15% of Ni, 5.2% of Cu and 1.3% of Mn on $SiO_2$.

The use of Raney nickel is particularly advantageous. As a rule, the reaction mixture is fed, initially and during the reaction, with such amounts of hydrogen that a suitable reaction pressure, preferably from 40 to 150 atmospheres, is established at the reaction temperature. Inert gases such as nitrogen can also be used to adjust the pressure. The residence time in the reaction chamber is as a rule from 15 to 600 minutes.

The reaction can be carried out as follows: the starting ester and the formaldehyde, together with any solvent, are introduced into a reactor, the catalyst and the acid are added and the reaction chamber is flushed with nitrogen. Hydrogen is then injected until the above-mentioned reaction pressure is reached. The reaction mixture is then brought to the abovementioned temperature and kept at this temperature, whilst passing in further hydrogen, until no more hydrogen is consumed by the reaction. The reaction mixture is now cooled and filtered. The end product is isolated from the filtrate by conventional methods, for example by the addition of water, isolation of the lower organic phase from the two-phase mixture formed, and fractional distillation.

The compounds which can be manufactured in accordance with the process of the invention are valuable starting materials for the synthesis of dyes, especially crystal violets and reactive dyes, and of pesticides. They can be used as stabilizers for unsaturated polyester resins, for example in accordance with the process described in Belgian Patent No. 640,930.

British Patent No. 985,750 describes the use of 5-dimethylaminoisophthalic acid dimethyl ester as a cure accelerator of polymerizable mixtures which contain unsaturated polyesters and ethylenic monomers, and U.S. Pat. No. 2,891,929 describes the manufacture of linear polyesters of the end products according to the invention. Information on their use is to be found in the above publications.

The parts mentioned in the examples which follow are parts by weight. Parts by weight bear the same relation to parts by volume as the kilogram to the liter.

EXAMPLE 1

181 parts of 3-nitrobenzoic acid methyl ester are suspended in 475 parts of methanol and are hydrogenated at 48° C under 100 atmospheres hydrogen pressure, after addition of 225 parts of aqueous formaldehyde solution (40% strength by weight), 15 parts of propionic acid and 8 parts of Raney nickel. After 112 parts by volume of hydrogen have been taken up in the course of 10 hours, the mixture is separated from the catalyst. The solvent is then distilled off and at the same time the decrease in volume is made up with water. 3-dimethylaminobenzoic acid methyl ester, which is insoluble in water, separates out as the lower phase. This phase is separated off and distilled in vacuo. 165 parts of 3-dimethylaminobenzoic acid methyl ester distil at a temperature of 123° to 125° C/2.5 mm Hg; according to gas chromatography, the purity of the product is 99.5% ($n_D^{23} = 1.5636$), corresponding to a yield of 92% of theory.

EXAMPLE 2

181 parts of 3-nitrobenzoic acid methyl ester are suspended in 960 parts of methanol and are hydrogenated at 48° C under 100 atmospheres hydrogen pressure, analogously to Example 1, after addition of 190 parts of formaldehyde solution, 7.4 parts of propionic acid and 14 parts of Raney nickel. 112 parts by volume of hydrogen are taken up in the course of 12 hours. 159 parts of 3-dimethylaminobenzoic acid methyl ester of 99.5% purity ($n_D^{23} = 1.5636$), corresponding to 89% of theory, are obtained analogously to Example 1.

EXAMPLE 3

181 parts of 3-nitrobenzoic acid methyl ester are suspended in 1,000 parts of methanol and are hydrogenated at 48° C under 100 atmospheres hydrogen pressure, after addition of 225 parts of formaldehyde solution, 15 parts of glacial acetic acid and 10 parts of Raney nickel. 112 parts by volume of hydrogen are taken up in the course of 12 hours. 164 parts of 3-dimethylaminobenzoic acid methyl ester ($n_D^{23} = 1.5636$), of 99.5% purity as determined by gas chromatography, corresponding to 92% of theory, are obtained analogously to Example 1.

EXAMPLE 4 (comparison)

181 parts of 3-nitrobenzoic acid methyl ester are suspended in 1,000 parts of methanol and are hydrogenated at 40° C under 100 atmospheres hydrogen pressure, after addition of 225 parts of formaldehyde solution, 30 parts of hydrochloric acid (27% strength by weight) and 4.8 parts of platinum oxide. 110 parts by volume of hydrogen are taken up in the course of 17 hours. 140 parts of 3-dimethylaminobenzoic acid methyl ester, of 86% purity as determined by gas chromatography, and 20 parts of 3-aminobenzoic acid methyl ester are obtained, corresponding to a yield of 67% of theory.

EXAMPLE 5 (comparison)

181 parts of 3-nitrobenzoic acid methyl ester are suspended in 1,000 parts of methanol and are hydrogenated at 40° C under 100 atmospheres hydrogen pressure, after addition of 225 parts of formaldehyde solution, 33 parts of trimethylammonium chloride and 18 parts of Raney nickel. The hydrogen uptake ceases after 6 hours. Further working up is analogous to Example 1. 144 parts of 3-dimethylaminobenzoic acid methyl ester, of 90% purity as determined by gas chromatography, and 14 parts of 3-aminobenzoic acid methyl ester, are obtained, corresponding to a yield of 73% of theory.

EXAMPLE 6

181 parts of 4-nitrobenzoic acid methyl ester are suspended in 475 parts of methanol and are hydrogenated at 60° C under 100 atmospheres hydrogen pressure, after addition of 225 parts of aqueous formaldehyde solution (40% strength by weight), 30 parts of propionic acid and 12 parts of Raney nickel. After 112 parts by volume of hydrogen have been taken up in the course of 6 hours, the mixture is separated from the catalyst. The solvent is then distilled off at the same time the decrease in volume is made up with water. 4-dimethylaminobenzoic acid methyl ester, which is insoluble in water, separates out as crystals on cooling. The end product is filtered off, washed with water and dried. 170 parts of 4-dimethylaminobenzoic acid methyl ester of melting point 95° to 98° C are obtained, corresponding to a yield of 95% of theory.

EXAMPLE 7

181 parts of 3-nitrobenzoic acid methyl ester are suspended in 475 parts of methanol and are hydrogenated at 60° C under 100 atmospheres hydrogen pressure, after addition of 225 parts of aqueous formaldehyde solution (40% strength by weight), 30 parts of lactic acid and 10 parts of Raney nickel. After 112 parts of volume of hydrogen have been taken up in the course of 3 hours, the mixture is separated from the catalyst. The solvent is then distilled off and at the same time the decrease in volume is made up with water. 3-dimethylaminobenzoic acid methyl ester, which is insoluble in water, separated out as the lower phase. This phase is separated off and distilled in vacuo. 163 parts of 3-dimethylaminobenzoic acid methyl ester distil at a temperature of 123° to 125° C/2.5 mm Hg; the purity of the product as determined by gas chromatography is 98.5%, corresponding to a yield of 90% of theory.

EXAMPLE 8

181 parts of 3-nitrobenzoic acid methyl ester are suspended in 475 parts of methanol and are hydrogenated at 60° C under 100 atmospheres hydrogen pressure, after addition of 225 parts of aqueous formaldehyde solution (40% strength by weight), 20 parts of succinic acid and 10 parts of Raney nickel. After 122 parts by volume of hydrogen have been taken up in the course of 4 hours, the mixture is separated from the catalyst. After working up analogously to Example 1, 158 parts of 3-dimethylaminobenzoic acid methyl ester (boiling point $_{2.5}$ 123° to 125° C) of 98% purity, as determining by gas chromatography, are obtained, corresponding to a yield of 87% of theory.

EXAMPLE 9

195 parts of 3-nitrobenzoic acid ethyl ester are suspended in 475 parts of methanol and are hydrogenated at 60° C under 100 atmospheres hydrogen pressure, after addition of 225 parts of aqueous formaldehyde solution (40% strength by weight), 30 parts of propionic acid and 15 parts of Raney nickel. After 112 parts by volume of hydrogen have been taken up in the course of 6 hours, the mixture is separated from the catalyst. After working up as described in Example 1, 172 parts of 3-dimethylaminobenzoic acid ethyl ester of boiling point 125° to 130° C/2.5 mm Hg and 95% purity, as determined by gas chromatography, are obtained, corresponding to a yield of 85% of theory.

EXAMPLE 10

5-dimethylamino-isophthalic acid dimethyl ester 70 parts of 5-nitroisophthalic acid dimethyl ester are suspended in 445 parts of methanol and are hydrogenated at 60° C under 100 atmospheres hydrogen pressure, after addition of 70 parts of aqueous formaldehyde solution (40% strength by weight), 9 parts of propionic acid and 7 parts of Raney nickel. After 30 parts by volume of hydrogen have been taken up in the course of 3 hours, the catalyst is filtered off and the solution is cooled to room temperature. The end product which precipitates is filtered off and dried in vacuo at 50° C. parts of 5-dimethylamino-isophthalic acid dimethyl ester or melting point 118° to 121° C are obtained. This corresponds to a yield of 85% of theory.

EXAMPLE 11

4-dimethylamino-phthalic acid dimethyl ester 90 parts of 4-nitrophthalic acid dimethyl ester are suspended in 580 parts of menthanol and are hydrogenated at 60° C under 100 atmospheres hydrogen pressure, after addition of 90 parts of aqueous formaldehyde solution (40 per cent strength), 18 parts of propionic acid and 9 parts of Raney nickel. After the hydrogen uptake has ceased, the mixture is freed from the catalyst by filtration and the methanolic solution is diluted with 2,000 parts of water. 4-dimethylaminophthalic acid dimethyl ester separates out initially as an oil, which is separated off and cyratallizes to colorless cyrstals. 75 parts of 4-dimethylamino-phthalic acid dimethyl ester of melting point 54° to 57° C are obtained, corresponding to a yield of 85% of theory.

EXAMPLE 12

4-dimethylamino-phthalic acid dimethyl ester 90 parts of 4-nitrophthalic acid dimethyl ester are suspended in 580 parts of methanol and are hydrogenated at 60° C under 100 atmospheres hydrogen pressure, after addition of 90 parts of aqueous formaldehyde solution (40 per cent strength), 15 parts of lactic acid and 9 parts of Raney nickel. After the hydrogen uptake has ceased, the mixture is freed from the catalyst by filtration and the methanolic solution is diluted with 2,000 parts of water. 4-dimethylamino-phthalic acid dimethyl ester, which initially separates out as an oil, crystallizes after separating off the water phase. 74 parts of 4-dimethylamino-phthalic acid dimethyl ester of melting point 55° to 57° C are obtained, corresponding to a yield of 84% of theory.

EXAMPLE 13

5-dimethylamino-isophthalic acid dimethyl ester 70 parts of 5-nitroisophthalic acid dimethyl ester are suspended in 445 parts of methanol and are hydrogenated at 80° C under 100 atmospheres hydrogen pressure, after addition of 70 parts of aqueous formaldehyde solution (40 per cent strength), 9 parts of propionic acid and 40 parts of a Ni/Cu/Mn supported catalyst which contains 15% by weight of nickel, 5.2% by weight of copper and 1.3% by weight of manganese on silica as the support. The mixture is worked up analogously to Example 10. 59 parts of 5-dimethylaminoisophthalic acid dimethyl ester of boiling point 118° to 120° are obtained. This corresponds to a yield of 85% of theory.

EXAMPLE 14

4-dimethylamino-phthalic acid diethyl ester 64 parts of 4-nitrophthalic acid diethyl ester are dissolved in 560 parts of methanol and are hydrogenated at 60° C under 100 atmospheres hydrogen pressure, after addition of 90 parts of aqueous formaldehyde solution (40 per cent strength), 18 parts of propionic acid and 9 parts of Raney nickel. After the hydrogen uptake has ceased, the mixture is freed from the catalyst by filtration and the methanolic solution is diluted with 2,000 parts of water. The ester, which initially separates out as an oil, crystallizes out after separating off the water phase. 55 parts of 4-dimethylaminophthalic acid diethyl ester of melting point 62° to 64° C are obtained, corresponding to a yield of 86% of theory.

We claim:

1. A process for the manufacture of a dimethylaminobenzenecarboxylic acid ester by reaction of a nitrobenzenecarboxylic acid ester with formaldehyde and hydrogen in the presence of a hydrogenation catalyst, which comprises reacting a nitrobenzenecarboxylic acid ester with hydrogen and formaldehyde at a ratio of 2 to 8 moles of formaldehyde per mol of said ester in the presence of a hydrogenation catalyst which contains one or more metals of atomic numbers from 24 to 29, and in the presence of a weak organic acid, at a temperature in the range of 35° to 150° C and at a pressure of at least 40 atmospheres.

2. A process as claimed in claim 1, wherein the reaction is carried out with an ester of 4-nitrobenzoic acid or 3-nitrobenzoic acid with an aromatic, cycloaliphatic, araliphatic or aliphatic alcohol.

3. A process as claimed in claim 1, wherein the reaction is carried out with an ester of a benzenedicarboxylic acid or benzenetricarboxylic acid, in which the nitro group is not in the o-position to an ester group, with an aromatic, cycloaliphatic, araliphatic or aliphatic alcohol.

4. A process as claimed in claim 1, wherein the reaction is carried out using a ratio of 2 to 3 moles of formaldehyde per mole of said ester.

5. A process as claimed in claim 1, wherein the reaction is carried out at a temperature from 45° to 95° C.

6. A process as claimed in claim 1, wherein the reaction is carried out at a temperature from 45° to 70° C.

7. A process as claimed in claim 1, wherein the reaction is carried out at a pressure from 50 to 250 atmospheres.

8. A process as claimed in claim 1, wherein the reaction is carried out at a pressure from 70 to 110 atmospheres.

9. A process as claimed in claim 1, wherein the reaction is carried out in the presence of an organic solvent which is inert under the reaction conditions.

10. A process as claimed in claim 1, wherein the reaction is carried out in the presence of an aliphatic carboxylic acid of 3 to 10 carbon atoms, used in amounts of 0.1 to 0.5 mole of acid per mole of said ester.

11. A process as claimed in claim 1, wherein the reaction is carried out using the catalyst in an amount of 0.5 to 50% by weight, based on said ester.

12. A process as claimed in claim 1, wherein the reaction is carried out in the presence of a weak organic acid having a dissociation constant of $1.5 \times 10^{-4}$ to $1 \times 10^{-6}$.

13. A process as claimed in claim 12 wherein said weak organic acid is an alkane monocarboxylic acid having 3–10 carbon atoms and is used in an amount of 0.1 to 0.5 mole per mole of said ester.

14. A process as claimed in claim 1 wherein said hydrogenation catalyst is Raney nickel.

* * * * *